United States Patent
Nicholas et al.

(10) Patent No.: US 7,327,225 B2
(45) Date of Patent: Feb. 5, 2008

(54) ACTIVATION CONTROL OF A VEHICULAR REAR VIEW VIDEO DISPLAY

(75) Inventors: Clayton L. Nicholas, Indianapolis, IN (US); Paul R. Martindale, Carmel, IN (US)

(73) Assignee: Delphi Technologies, Inc., Troy, MI (US)

( * ) Notice: Subject to any disclaimer, the term of this patent is extended or adjusted under 35 U.S.C. 154(b) by 241 days.

(21) Appl. No.: 11/147,905

(22) Filed: Jun. 8, 2005

(65) Prior Publication Data

US 2007/0008082 A1    Jan. 11, 2007

(51) Int. Cl.
*B60Q 1/00* (2006.01)
*H04N 7/18* (2006.01)

(52) U.S. Cl. ............... 340/425.5; 340/456; 340/441; 348/118; 348/148

(58) Field of Classification Search ............. 340/425.5
See application file for complete search history.

(56) References Cited

U.S. PATENT DOCUMENTS

| | | | | |
|---|---|---|---|---|
| 5,191,312 A | * | 3/1993 | Altmann et al. | ............ 340/441 |
| 6,201,642 B1 | | 3/2001 | Bos | |
| 2005/0073582 A1 | * | 4/2005 | Moisel et al. | ............... 348/148 |
| 2006/0164220 A1 | * | 7/2006 | Harter et al. | ............... 340/435 |

FOREIGN PATENT DOCUMENTS

| | | |
|---|---|---|
| DE | 197 54 249 | 6/1999 |
| DE | 200 16 360 | 1/2001 |
| EP | 1 065 642 | 1/2001 |
| JP | 11 245723 | 9/1999 |

OTHER PUBLICATIONS

European Search Report dated Oct. 5, 2006.

* cited by examiner

*Primary Examiner*—Donnie L. Crosland
(74) *Attorney, Agent, or Firm*—Douglas D. Fekete

(57) ABSTRACT

The activation of a rear view video display in a vehicle is interrupted under specified operating conditions to discourage inappropriate driver reliance on the video display. The video display is automatically activated when the reverse transmission range of the vehicle is selected, but is deactivated if the vehicle speed in the reverse range exceeds a calibrated threshold such as 2-3 MPH. When the vehicle speed falls back below the threshold, the video display is automatically re-activated, thereby encouraging the driver to use the video display only for the purposes for which it was designed, and to use other ways of obtaining a more comprehensive rearward view when backing at speeds in excess of the threshold.

5 Claims, 1 Drawing Sheet

ACTIVATION CONTROL OF A VEHICULAR REAR VIEW VIDEO DISPLAY

TECHNICAL FIELD

The present invention relates to the control of a video display that presents the driver of a vehicle with a view rearward of the vehicle, and more particularly to a control that discourages excessive driver reliance on the video display when the vehicle is being operated in reverse.

BACKGROUND OF THE INVENTION

Various proposals have been made for mounting a rearward-facing video camera on a motor vehicle and displaying images obtained from the camera on a video display installed in the forward viewing area of the driver. For example, the video display can be incorporated into the instrument panel, or configured as a head-up display as suggested in the U.S. Pat. No. 5,414,439 to Groves et al. Frequently, the objective is to provide the driver a view that is superior to usual semi-obstructed views obtained from conventional interior and exterior rear view mirrors when the vehicle is being operated in reverse.

The aforementioned display arrangements are usually designed for a limited purpose, such as to reveal in-path obstructions immediately behind the vehicle, and therefore display only a portion of the scene a driver should visually scan when operating in reverse. This can be a problem with drivers that tend to over-rely on the displayed video image, and neglect to use other standard equipment such as the interior and exterior rear view mirrors that present a significantly wider viewing angle. Accordingly, what is needed is a rear view video display control that discourages excessive driver reliance on the video display when the vehicle is being operated in reverse.

SUMMARY OF THE INVENTION

The present invention is directed to a control method for a rear view video display in which the activation of the display is interrupted under specified operating conditions to discourage inappropriate driver reliance on the video display. The control is responsive to the transmission range selected by the driver and the rearward speed of the vehicle. The video display is automatically activated (if not already activated) when the reverse transmission range is selected, but is deactivated if the vehicle speed in the reverse range exceeds a calibrated threshold such as 2-3 MPH. When the vehicle speed falls back below the threshold, the video display is automatically re-activated, thereby encouraging the driver to use the video display only for the purposes for which it was designed, and to use other ways of obtaining a more comprehensive rearward view when backing at speeds in excess of the threshold.

DESCRIPTION OF THE PREFERRED EMBODIMENT

Figure 1:
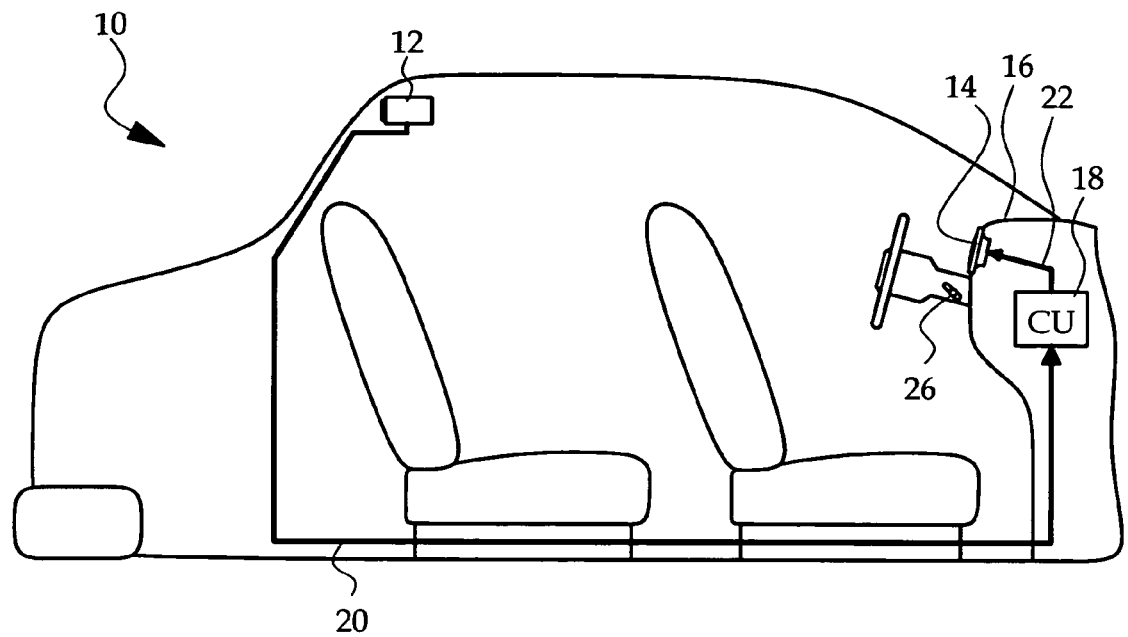
FIG. 1 is a diagram of a vehicle, including an imaging device, a rear view video display and a control unit for carrying out control of the present invention.

Referring to FIG. 1, the reference numeral 10 generally designates a sedan-type vehicle equipped with a rear view imaging device 12 such as a CCD camera, a driver display 14 such as a flat screen LCD panel, and a microprocessor-based video control unit (CU) 18. The camera 12 is centrally mounted near the rear of the vehicle 10, and the video display 14 is incorporated into an instrument panel 16 forward of the vehicle operator. Of course, the location of display 14 may vary depending on the application; for example, the display 14 may be configured as a head-up display, or may be incorporated into an interior rear view mirror. Video data produced by camera 12 is coupled to control unit 18 via line 20, and control unit 18 activates the display 14 via line 22.

Figure 2:
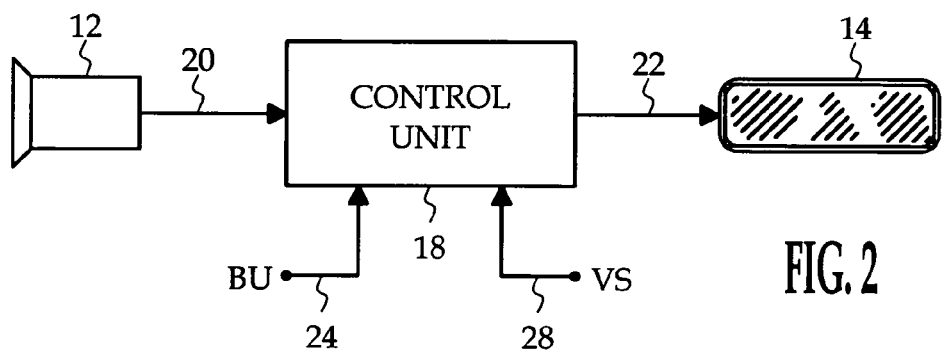
FIG. 2 is a block diagram of the imaging device, video display and control unit of FIG. 1.

The camera 12, display 14 and control unit 18 are separately depicted in FIG. 2, along with two input signals designated as BU and VS. The BU input on line 24 is a back-up or reverse input responsive to the position of a driver-manipulated transmission range selector 26 (see FIG. 1), and signals the control unit 18 when the reverse transmission range is selected. The VS input on line 28 is a vehicle speed input responsive to the speed of a rotating member such as a transmission output gear or a wheel, and supplies control unit 18 with a measure of the vehicle speed. In general, the control unit 18 activates the display 14 to show video data produced by the camera 12 when the BU input indicates that the vehicle 10 is being operated in reverse.

The purpose of the display 14 is to assist the driver during various backing maneuvers by presenting a view rearward of the vehicle 10 that is superior to the usual semi-obstructed views obtained from conventional interior and exterior rear view mirrors. In many installations, the camera 12 is oriented to reveal in-path obstructions immediately behind the vehicle, and the image shown on display 14 comprises only a portion of the scene a driver should ordinarily scan when backing up vehicle 10. Thus, while the displayed image can be very useful to the driver, it necessarily omits some out-of-path information, and supplemental information obtained by viewing the mirrors and looking out the various windows of the vehicle is still needed. Consequently, a driver can over-rely on the display 14, particularly when backing up at speeds in excess of say, 2-3 MPH. The method of the present invention discourages this type of behavior by deactivating the display 14 if the vehicle speed in the reverse range exceeds a calibrated threshold such as 2-3 MPH. When the vehicle speed falls back below the threshold, the display 14 is automatically re-activated. This discourages inappropriate reliance on the display 14, and encourages the driver to other ways of obtaining a more comprehensive rearward view when backing at speeds in excess of the threshold.

Figure 3:
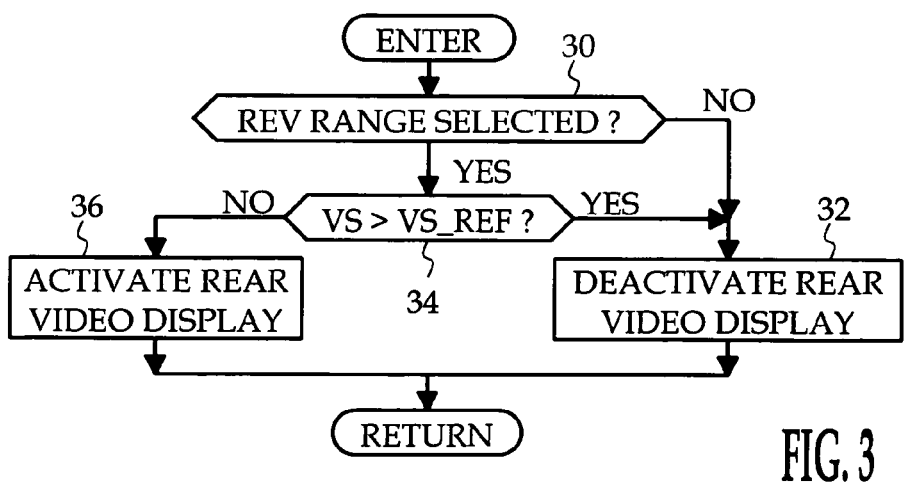
FIG. 3 is a flow diagram of a software routine executed by the control unit of FIG. 1 according to this invention.

FIG. 3 depicts a flow diagram representative of a software routine periodically executed by the control unit 18 for carrying out the above-described control. The block 30 first determines if the reverse range is selected based on the status of the BU input. If not, the block 32 is executed to deactivate the display 14. If the reverse range is selected, the block 34 determines if the VS input indicates a vehicle speed in excess of a calibrated vehicle speed reference VS_REF such as 2-3 MPH. If not, the block 36 is executed to activate the display 14 to assist the driver's backing maneuver. However, if the vehicle speed rises above VS_REF while the reverse range is selected, block 34 will be answered in the affirmative, and the block 32 will deactivate display 14. When the rearward speed of vehicle 10 subsequently falls below VS_REF, block 34 will be answered in the negative, and the block 36 will reactivate display 14. Of course, a limited amount of hysteresis may be employed to prevent repeated activation and deactivation of the display 14 when the vehicle 10 is operated substantially at the reference speed VS_REF.

In summary, the present invention provides an effective way of discouraging inappropriate driver reliance on a limited purpose rear view video display 14 when performing backing maneuvers, while retaining the functionality of the display 14 under appropriate circumstances. While the present invention has been described with respect to the illustrated embodiment, it is recognized that numerous modifications and variations in addition to those mentioned herein will occur to those skilled in the art. For example, the invention can apply to any type of vehicle, and can include different kinds of imaging devices and displays. Also, the control unit 18 may provide additional information on the display 14, including a warning to the driver, the camera 12 may be located or oriented different than described herein, and so on. Accordingly, it is intended that the invention not be limited to the disclosed embodiment, but that it have the full scope permitted by the language of the following claims.

The invention claimed is:

1. A rear view display control for a vehicle, comprising the steps of:
   providing a video display for a driver of the vehicle;
   providing an imaging device for producing video image signals responsive to an in-path portion of a scene rearward of the vehicle;
   activating said video display with the produced video image signals to display a video image of the in-path portion of said rearward scene when said vehicle is being operated in reverse; and
   deactivating said video display when a speed of said vehicle during reverse operation exceeds a reference speed to encourage the driver to consider both in-path and out-of-path portions of said rearward scene when the reverse speed of the vehicle exceeds said reference speed.

2. The rear view display control of claim 1, including the step of:
   re-activating said video display with the produced video image signals when the speed of said vehicle when operated in reverse falls below said reference speed.

3. The rear view display control of claim 1, wherein said reference speed is calibrated to correspond to a vehicle speed of about 2-3 MPH.

4. The rear view display control of claim 1, including the step of:
   activating a driver warning when said video display is deactivated due to the reverse speed of said vehicle exceeding said reference speed.

5. The rear view display control of claim 1, including the steps of:
   detecting reverse operation of said vehicle;
   comparing the vehicle speed to said reference speed when said reverse operation is detected;
   activating said video display if the comparison reveals that the vehicle speed is less than said reference speed; and
   deactivating said video display if the comparison reveals that the vehicle speed is greater than said reference speed.

* * * * *